United States Patent [19]

Shimakata et al.

[11] Patent Number: 4,628,537

[45] Date of Patent: Dec. 9, 1986

[54] SYSTEM FOR IDENTIFYING A RESPONDING STATION FOR A RADIO COMMUNICATIONS SYSTEM

[75] Inventors: Masashi Shimakata; Katsuaki Kawamura; Toshiaki Tsuchiya; Yuichiro Shioya; Takao Inoue; Mitsuo Syoji; Keiichi Kuroda, all of Kawagoe, Japan

[73] Assignee: Pioneer Electronic Corporation, Tokyo, Japan

[21] Appl. No.: 543,056

[22] Filed: Oct. 18, 1983

[30] Foreign Application Priority Data

Oct. 19, 1982 [JP] Japan .................................. 57-183258
Oct. 19, 1982 [JP] Japan .................................. 57-183260
Oct. 19, 1982 [JP] Japan .................................. 57-183263

[51] Int. Cl.[4] .............................................. H04B 7/00
[52] U.S. Cl. ........................................ 455/34; 455/58; 455/38; 455/77; 371/34; 340/825.54
[58] Field of Search ............... 455/32, 34, 31, 38, 455/53, 54, 58, 59, 77–79; 340/825.5, 825.51, 825.54; 375/7.9; 371/34; 370/85; 179/2 EB

[56] References Cited

U.S. PATENT DOCUMENTS

| | | | |
|---|---|---|---|
| 3,535,636 | 10/1970 | Muilwijk | 455/32 |
| 3,634,627 | 1/1972 | Velentini | 455/34 |
| 3,955,140 | 5/1976 | Stephens et al. | 455/58 |
| 4,014,004 | 3/1977 | Fuller | 375/9 |
| 4,144,412 | 3/1979 | Ito et al. | 455/33 |
| 4,228,319 | 10/1980 | De Jagger et al. | 455/31 |
| 4,352,955 | 10/1982 | Kai et al. | 455/38 |
| 4,360,927 | 11/1982 | Bowen et al. | 455/32 |
| 4,392,242 | 7/1983 | Kai | 455/34 |
| 4,400,585 | 8/1983 | Kaman et al. | 455/34 |

Primary Examiner—Jin F. Ng
Attorney, Agent, or Firm—Fleit, Jacobson, Cohn & Price

[57] ABSTRACT

A communications system for identifying a responding station called by a communications system caller station over a call channel and a plurality of speech channels. The system transmits information from the caller station, such as the selected speech channel and the designated responding station through the call channel, and receives information from a responding station on the selected speech channel. The communication between the communications system and the responding station on the selected speech channel is enabled only when information from the responding station is identical to information of the designated responding station transmitted from the communications system.

2 Claims, 8 Drawing Figures

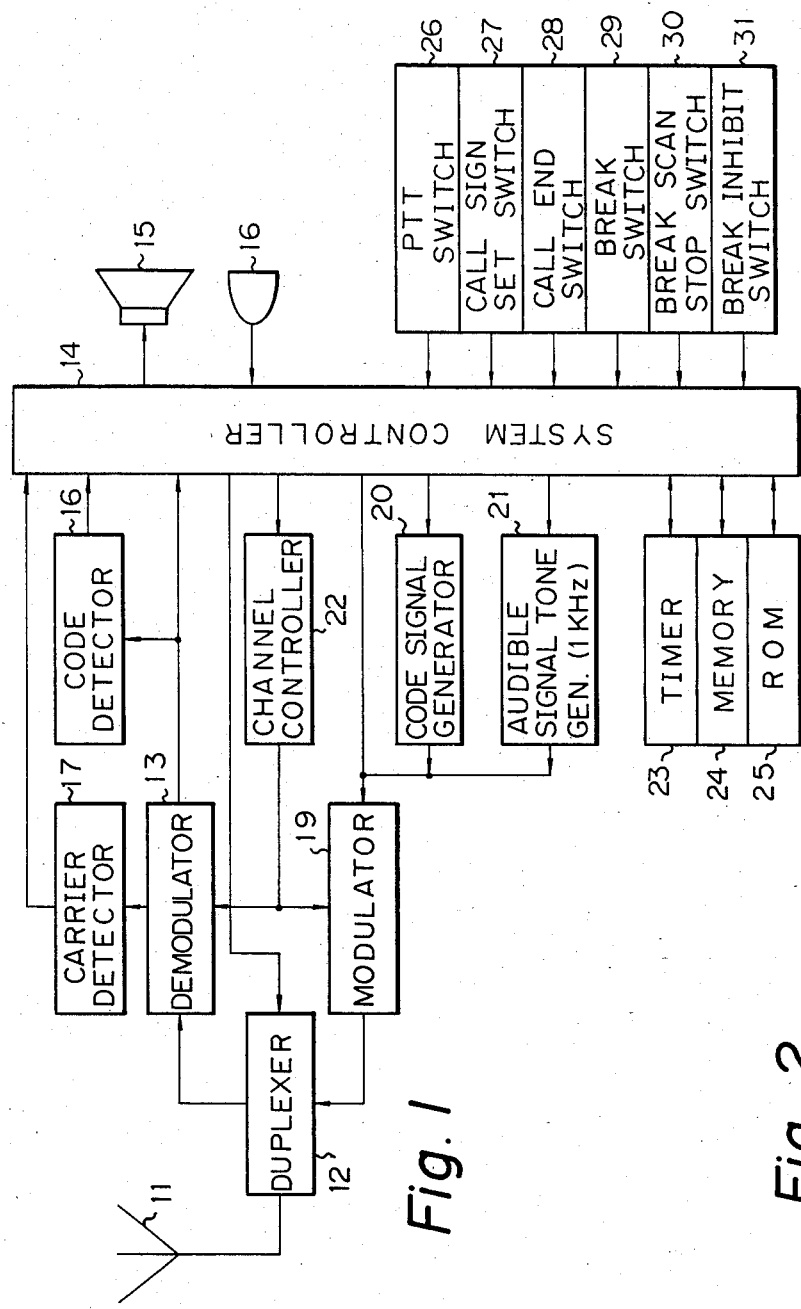

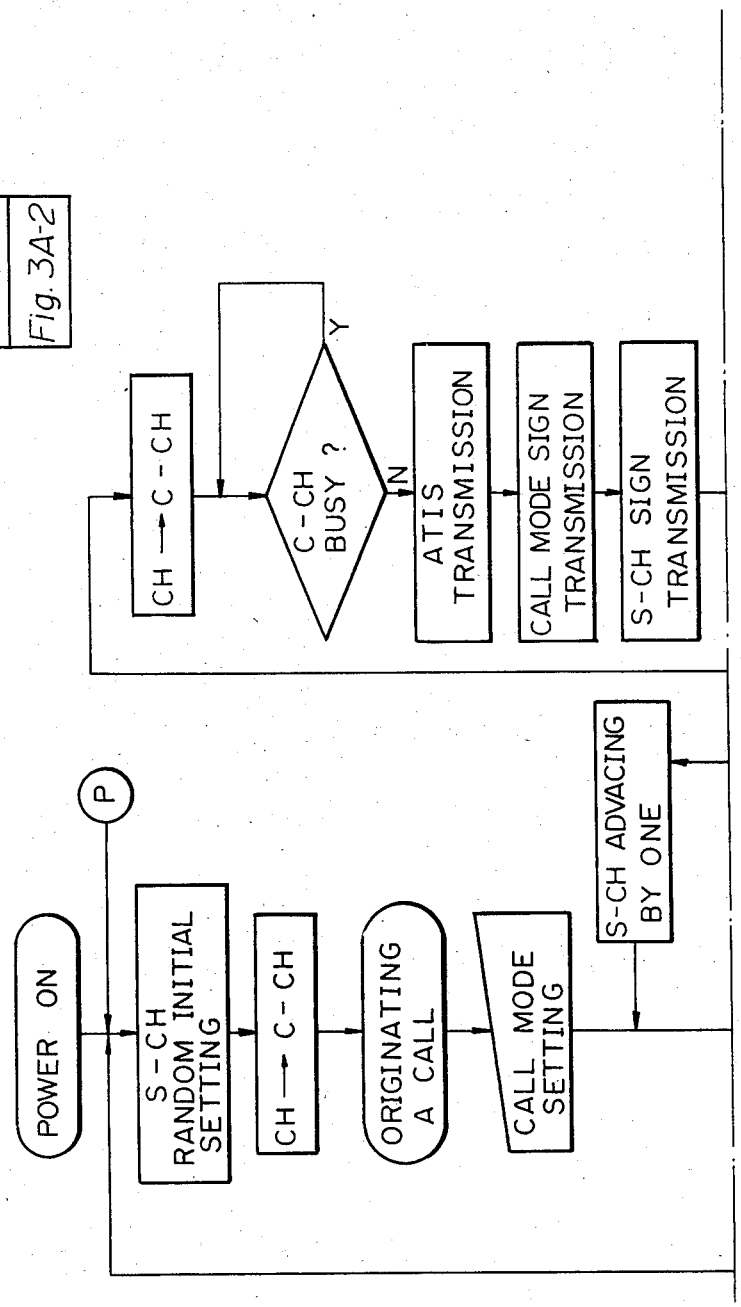

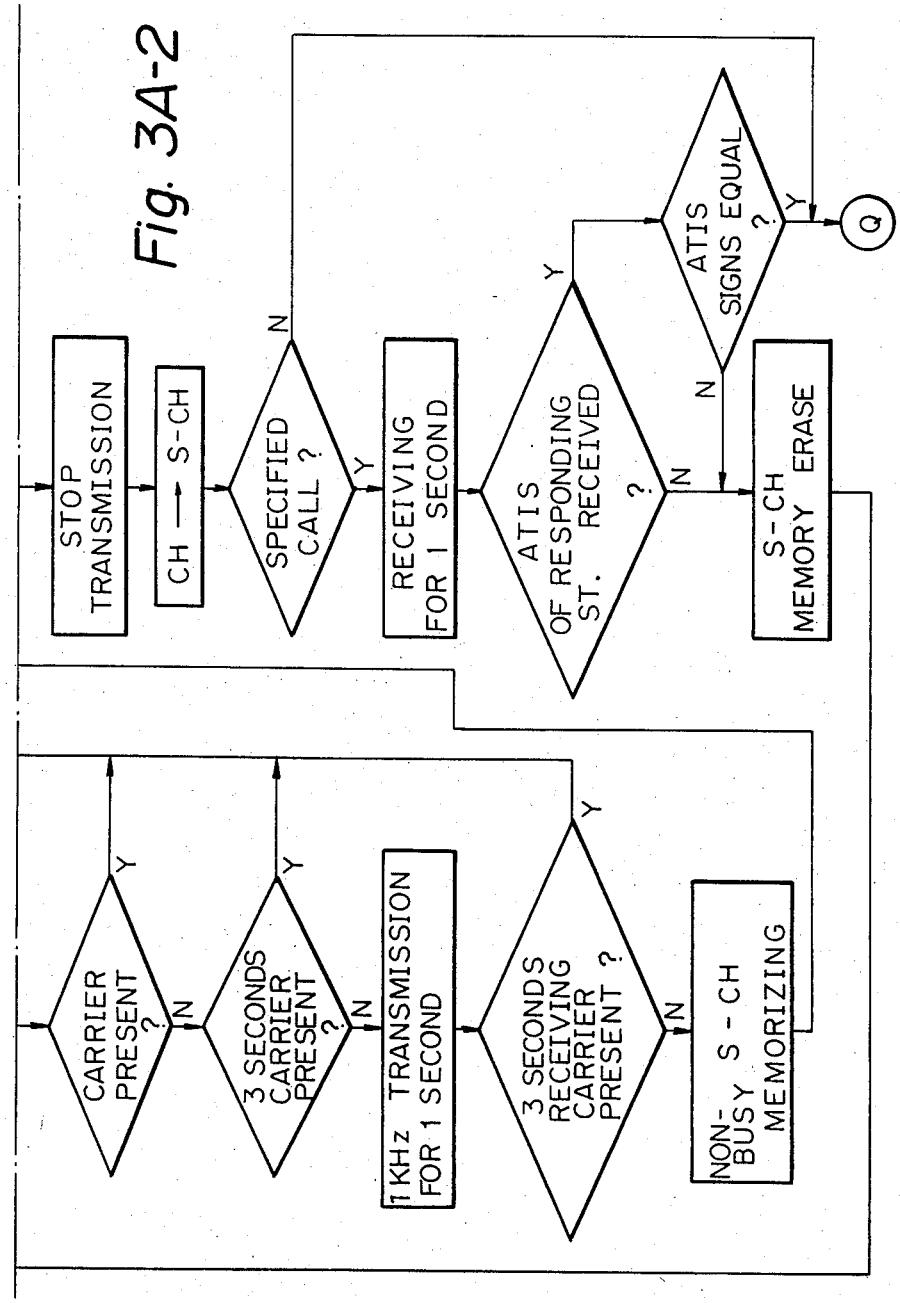

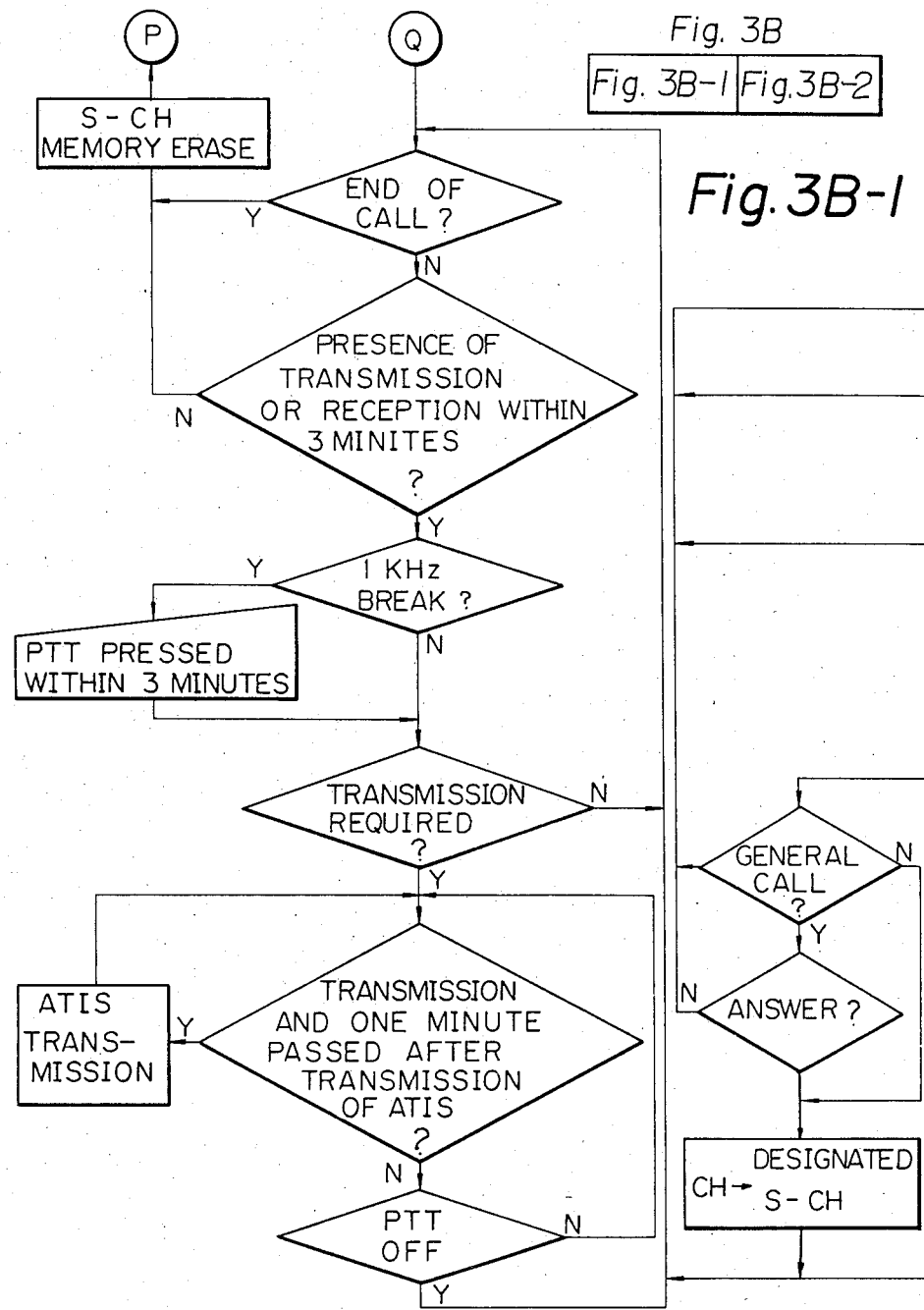

SYSTEM FOR IDENTIFYING A RESPONDING STATION FOR A RADIO COMMUNICATIONS SYSTEM

BACKGROUND OF THE INVENTION

1. Field of the Invention

The present invention relates to a system for identifying a responding station for a radio communications system, and more specifically to a responding station identification system to be incorporated in a communications system such as an amateur radio system or a CB (Citizens Band) radio system.

2. Description of Background Information

In radio communications systems such as amateur radio systems of the VHF band and the UHF band, or CB radio systems of the United States, it is general to use a single call channel and a plurality of speech channels.

Further, there is a type of communications system in which a search of an open channel, i.e., a non-busy channel of the speech channel is to be first performed and initiated by a manual operation, in the case of giving a call toward the other station(s). When a non-busy channel is found out among the speech channels, then a call to a responding station is made through the call channel so as to designate the selected speech channel. After that, both of the caller (home) station and the responding station are tuned at the designated speech channel so that a mutual communication is started.

This type of communications system, however, has a drawback that the manner of operation tends to be rather difficult. Moreover, an occupation of a speech channel is likely to occur in the communications system of this type. Therefore, it is required to eliminate the complexity of operation, so that the designation of the responding station is performed without fail. To this end, it is desirable that the identification of the responding station is executed automatically.

SUMMARY OF THE INVENTION

An object of the invention is therefore to alleviate the complexity of the operation of the system and to provide a system for identifying a responding station, which can identify the responding station automatically and very precisely.

Another object of the present invention is to provide a communications system in which the complexity of the operation is alleviated and a search of a non-busy speech channel is performed automatically and positively.

Further object of the present invention is to provide a responding system for a communications system in which the complexity of the operation is alleviated and identification of the station is positively performed by an automatically transmitting information of the responding station to the caller station.

According to the present invention, a system for identifying a responding station for a radio communications system operative as a caller station and having a call channel and a plurality of speech channels one of which is to be selected to convey information, is characterised by sequential operations of (I) transmitting at least information of the caller station, information of a selected speech channel, and an information of a designated responding station via the call channel, (II) automatically switching the communications system to a receiving state at the selected speech channel after completion of the transmission, to detect information from a responding station, and (III) placing the communications system in a state of mutual communication between the caller station and the responding station only when the information from the responding station is equal to the information of the designated responding station transmitted from the communications system. Further, the system is preferably constructed to automatically return to the initial stand-by state at the call channel if the information from the responding station is not equal to the information transmitted from the caller station.

According to another aspect of the invention, a communications system having a plurality of speech channels one of which is to be selected to convey information, is characterized by a searching operation including sequential operations of (I) setting the communications system to a receiving state at a speech channel and detecting the presence of a carrier signal and in turn selecting a next speech channel and detecting the presence of a carrier signal if the carrier signal is present at the speech channel, (II) transmitting an audible signal at a selected speech channel at which the carrier signal is not detected, (III) detecting once more the presence of the carrier signal at the selected speech channel, and (IV) memorizing information of the selected speech channel as a non-busy speech channel only if the carrier signal is not present at the selected speech channel.

According to further aspect of the invention, a communications system operative as a caller station and having a plurality of speech channels one of which is to be selected to convey an information and having a searching operation of a sequence of (I) setting the communications system to a receiving state at a speech channel and detecting the presence of a carrier signal and in turn selecting a next speech channel and detecting the presence of the carrier signal if the carrier signal is present at the speech channel, (II) transmitting an audible signal at a selected speech channel at which the carrier signal is not detected, (III) detecting once more the presence of the carrier signal at the selected speech channel, and (IV) identifying the selected speech channel as a non-busy speech channel only if the carrier signal is not present at the selected speech channel, comprises means for receiving an audible signal transmitted from a third station and generating a receiving signal while a call between the caller station and a responding station is taking place at the selected speech channel, thereby indicating a break on the selected speech channal by means of the receiving signal.

According to still another aspect of the invention, a responding system for a communications system operative as a responding station and having a plurality of speech channels one of which is to be selected to convey information, comprising a control means for commanding sequential operations of (I) receiving at the call channel information of station transmitted from a caller station, information of a selected speech channel, and information of a designated responding station transmitted from a station, (II) automatically switching the communications system to a receiving state at the selected speech channel, (III) and detecting the presence of a carrier signal at the selected speech channel and transmitting at least information of the responding station when the carrier signal is not detected. Thus, an accurate identification of the responding station by the caller station becomes possible.

BRIEF DESCRIPTION OF THE DRAWINGS

The foregoing and other objects and advantages of the present invention become more clearly understood from the following description taken in conjunction with the accompanying drawings which are given by way of illustration only, and thus are not limitative of the present invention, and wherein;

FIG. 1 is a block diagram of the system for identifying the responding station according to the present invention;

FIG. 2 is a diagram showing the format of the transmitting data including an ATIS sign;

FIGS. 3A-1, 3A-2, 3B-1, and 3B-2, when combined, are a flowchart showing an operation of the system according to the present invention; and FIGS. 3A and 3B are figures respectively showing the manner in which FIGS. 3A-1 and 3A-2, FIGS. 3B-1 and 3B-2 are combined.

DETAILED DESCRIPTION OF A PREFERRED EMBODIMENT

Figures 2, 3B:
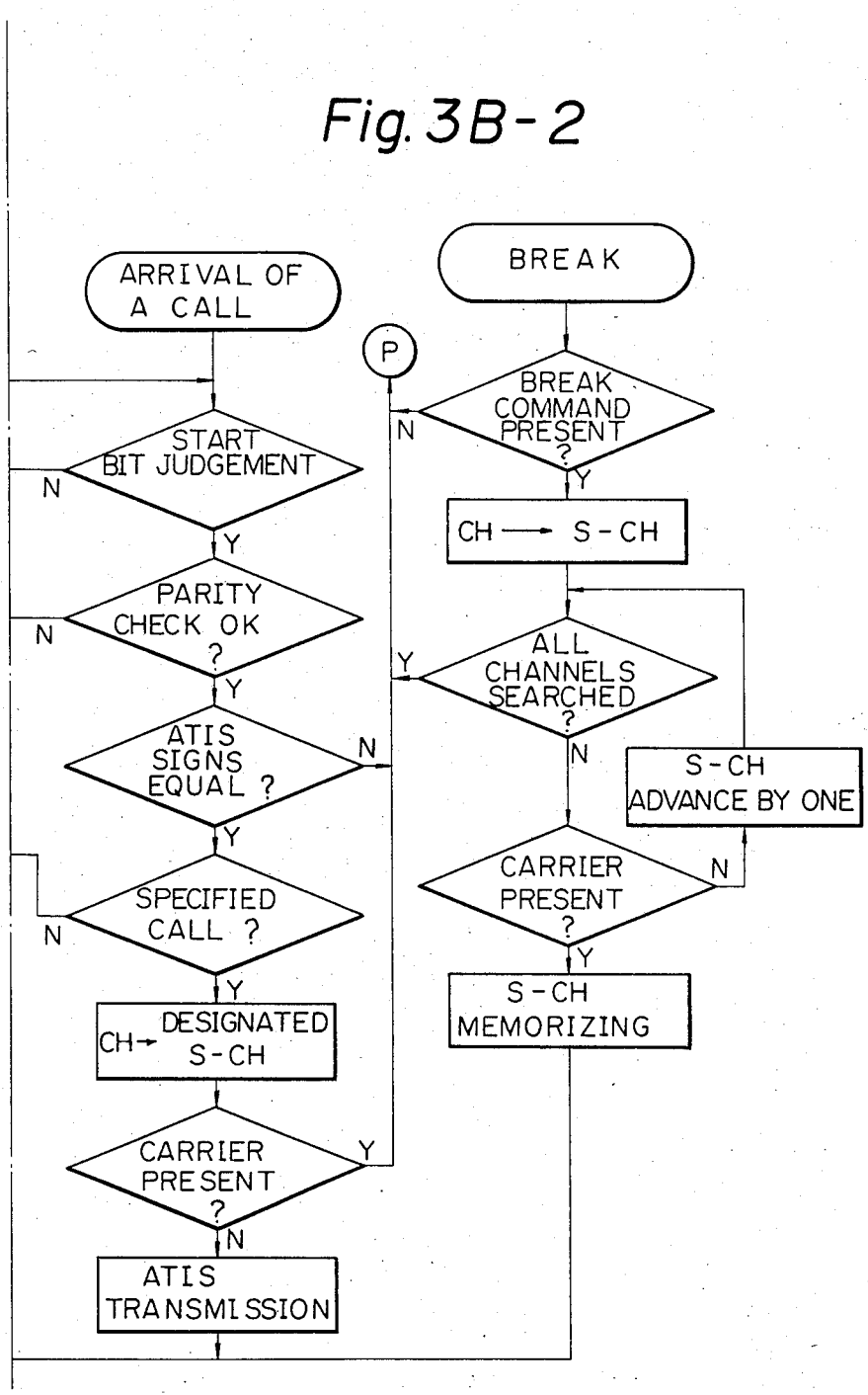

Reference is first made to the block diagram of FIG. 1, in which the circuit construction of the system according to the present invention is illustrated.

As shown, an RF (Radio Frequency) signal received at a transmitting and receiving anttena 11 is applied to a demodulator 13 via a duplexer 12. An output signal of the demodulator 13 is then applied to a system controller 14 in which a signal to drive a speaker unit 15 is produced in accordance with the input signal. The output signal of the demodulator 13 is also applied to a code detector 16 where the discrimination of a digital code signal (shown in FIG. 2) transmitted from a responding station takes place. In accordance with a code discrimination signal produced at the code detector 16, the system controller 14 controls the other circuit elements in various manners. The system controller 14 is also applied with an output signal of a carrier detector 17 which is connected to the demodulator 13 to detect the presence of an IF (Intermediate Frequency) carrier component of the receiving signal.

As for the transmitting part of the system, an output signal of a microphone 18 is applied to a modulator 19 via the system controller 14. In this case, an output signal of a code signal generator 20 and an output signal of an audible signal tone generator 21 are respectively applied to the modulator 19 at need. The code signal from the code signal generator 20 is a digital code signal having one hundred and twenty (120) binary bits in total. Specifically, the first fifteen (15) bits are start bit for previously notifying the transmission of the succeeding respective digital information. A thirty two (32) bit code after the start bit is ATIS (Automatic Transmitter Identification Signal) information that is a call sign data of the system itself operative as a home or caller station. The next two (2) bits are a call mode data which designate one of two modes of call, i. e. a general call to unspecified stations, and a specified call to the selected station or stations. The next thirty two (32) bits are the code of the responding station, that is, the call sign data of the responding station, and the succeeding six (6) bit S-CH code is a data of the speech channel. Finally, the last thirty three (33) bits are used as a digital sign for the parity check.

The signal of the audible signal tone generator 21 is, for example, a mono tone signal wave of 1 kHz generated, at need, for the time period of about one second in accordance with the control of the system controller 14.

An output signal of the modulator 19 is then applied to the antenna 11 via the duplexer 12 and radiated from the antenna 11. Further, there is provided a channel selector 22 consisting of a PLL (Phase Locked Loop) circuit, for selecting one of the RF channels in accordance with the control signal produced by the system controller 14. In the PLL circuit of the channel controller 22, an oscillating frequency of the VCO (Voltage Controlled Oscillator) is controlled by varying the dividing ratio of the programmable divider, in accordance with a control data from the system controller 14. Then the reception of the RF signal of the channel designated by the system controller 14 is performed by employing the VCO output signal as a local oscillation signal in the demodulator 13.

In addition, it will be appreciated that the transmission of the RF signal through a channel designated by the system controller 14 is enabled in the similar manner as the case of receiving.

The system is further provided with a timer 23 connected to the system controller 14 in order to measure the elapsed time after being activated by a trigger signal from the system controller 14. The timing or delay operation of the system controller 14 is performed in accordance with the output signal of the timer 23. The system is further provided with a memory 24 consisting of a RAM (Random Access Memory) for memorizing such data as the data of the speech channel and the ATIS data of the responding station. Also the system is provided with a ROM (Read Only Memory) 25 for storing the ATIS data of the caller station, i.e., the station itself. The reference numeral 26 indicates a PTT (Push To Talk) switch which is to be pressed if it is desired to change over the operation of the system to the transmitting state. The reference numeral 27 indicates a call sign set switch which is to be used for selecting one of two call modes, i.e., the general call and the specified call, and to designate the ATIS sign of the responding station in the case of the specified call. The reference numeral 28 indicates a call end switch for instructing the system of the end of the call. The reference numeral 29 indicates a break switch for breaking into the busy channel on which a call between the other stations is going on.

The operation of the system will be further explained with reference to FIGS. 3A-1, 3A-2, 3B-1, and 3B-2 which, when combined, are a flowchart of the operation of the communications system according to the present invention. Further, the lines (P) and (Q) of FIGS. 3B-1 and 3B-2 are to be connected to the lines (P) and (Q) of FIGS. 3A-1 and 3A-2 respectively, and the term C-CH used in the figures represents the call channel i.e., a single channel on which the digital codes shown in FIG. 2 is transmitted for originating a call towards the other stations. Also, the term S-CH used in the figures represents one of the speech channels on which the speech, the sign, and the audible signal tone are transmitted and received, and which is designated from among a plurality of speech channels.

When a power current is supplied to the system, one of the speech channels is selected randomly, then the system is set at the call channel for the initial stand-by operation. During this stand-by operation, whether the station is originating a call towards the other station or being called from the other station is detected first, and system is then moved to the next stage of operation.

The operation of the system will be further explained, and in which the case of the calling operation, that is, to originate a call, will be explained first. The call sign set switch 27 is manually operated at first to select one of the two call modes and at the same time the responding station is designated in the case of the specified call. Each of the data of the call mode and of the call sign is then memorized in the RAM 24. Subsequently, by pressing the PTT switch 26, the searching of the non-busy channel is performed automatically. Since the PTT switch 26 is used commonly for changing over the transmitting and receiving operations of the system during a call and for the above mentioned function for starting the search of the non-busy channel, the system is constructed so that a call mode set flag is produced when the PTT switch 26 is pressed during a call mode, and the generation of the call mode set flag is stopped during a state of mutual communication. Further, the system controller 14 detects the presence or the absence of the call mode flag to automatically perform the discrimination beween these operations.

The automatic search of the speech channel is performed according to the following sequence. As the channel controller 22 is controlled by the system controller 14 and set to the randomly designated speech channel which is previously memorized in the RAM 24 during the initial setting period, the duplexer 12 is actuated to apply the signal from the antenna 11 to the demodulator 13, and consequently the system is set at the receiving state. In this state, if a carrier signal is detected by the carrier detector 17, indicating that the selected speech channel is busy, the system is then shifted to the next one of the speech channels. If no carrier signal is detected the receiving state is maintained further three seconds and if a carrier signal is detected during this period, the searching of the speech channel will be further continued. If no carrier signal is detected during this three seconds, the system is set at the transmitting state, then the audible signal tone generator 21 is actuated to produce a signal of 1 KHz for the time period of one second. In addition, the passing of the time period of these three seconds and one second is measured in accordance with the control of the timer 23 in the above steps, and the measurement of the time period in the succeeding steps will be also performed in accordance with the operation of the timer 23.

After the elapse of the time period of one second, the system is returned to the receiving state on the designated speech channel and the presence or absence of the carrier signal is detected for further three seconds. If the carrier signal is present, the system will be shifted to the other speech channel once more. If there is no carrier signal, the speech channel is regarded as a non-busy channel and the data of this speech channel is memorized in the RAM 24. The search of the non-busy speech channel is performed automatically by effecting in turn this type of operation for each of the speech channels. The pupose of sending the 1 KHz mono tone signal is that, if the designated speech channel is busy, the mono tone signal is heard by the user of the speech channel, and consequently the user will send back a carrier signal by pressing the PTT switch, the detail of this operation will be further described after. By this carrier signal sent back by the user of the speech channel, the operator of the caller station is notified that this speech channel is busy. Thus, the searching of the non-busy channel can be performed without mistake.

Once the non-busy channel is found out in this way and the data of the selected speech channel is automatically memorized in the memory means, the system is then automatically reset at the call channel. At this point, the system is set in the receiving state, and whether or not the call channel is busy is judged by the output signal of the carrier detector 16. If the call channel is busy, the system will stand-by until the use of the call channel is completed. The digital data including the ATIS data of the caller station will be transmitted when the carrier signal disappears. This digital data is in the form shown in FIG. 2, and includes the data of the non-busy speech channel stored in the RAM 24, and the ATIS data of the responding station, the data of the mode of call, and the ATIS data of the system, i. e. the caller station stored in the ROM 25. After this operation, the system is set at the speech channel and held at the receiving state. In the case of the specified call, the system will then enter into a confirming operation with the responding station.

In the confirming operation, the following steps take place automatically. Firstly, the presence or the absence of the detection signal from the carrier detector 17 is detected in the receiving state for a time period of one second. If the ATIS sign from the responding station and other signs have been confirmed, then the ATIS sign of the responding station is compared with the ATIS sign stored in the RAM 24. The system, i.e. the caller station and the responding station can move into the state of mutual communication only when the ATIS signs are equal to each other.

If it is not possible to receive the ATIS sign of the responding station or if the ATIS sign of the responding station is not equal to the designated ATIS sign, the contents of the RAM 24 are erased and the system is automatically reset at the initial stand-by state. The above described sequence of operations is illustrated in FIG. 3A.

Since all of these operations are performed fully automatically, there is an advantage that the complexity of operation on the side of user is completely eliminated. Further, a positive search of the non-busy speech channel and a positive confirmation of the responding station become possible and the reliability of the system is by far improved.

The operation of the system during a state of the communication with a responding station will be further explained with reference to FIG. 3B. If the PTT switch is not operated and the output detection signal of the carrier detector 17 is not present for more than three minutes, the system controller 14 judges that the call has completed and erases the contents of RAM 24, and reset the system at the initial stand-by state. If the PTT switch 26 is pressed within three minutes, the system is set at the transmitting state, and the system is reset at the receiving state when the PTT switch 26 is released. If the 1 KHz audible tone is received in this state, that means that the audible tone is transmitted from the other station during the operation for searching the non-busy channel. Accordingly, the operator is required to press the PTT switch 26 to send the carrier signal for a while so as to let the operator of the other station, i.e. a third party, know that the speech channel is busy and to prevent a break into this speech channel.

In addition, the system is designed to transmit the ATIS sign at intervals of one minute so as to meet the standard requirements of the so-called personal wireless communications system in Japan.

In the case of the end of a call, the call end switch 28 is operated and the system is reset at the initial stand-by state.

The operation of the system in the case of receiving a call from the other station will be explained with reference to the flow chart shown in the central part of FIG. 3B. If a code (sign) is detected by the code detector 16 when the system is standing-by on the call channel, a received ATIS sign is compared with the ATIS sign stored in the ROM 25 after the sequential operation of the judgement of start bit, the read in of the data codes, the parity check, and the discrimination of the call mode. If the ATIS signs are equal to each other and the call is a specified call, the station is set at the designated speech channel. If the ATIS signs are not equal to each other, the system is automatically reset at the initial stand by state.

At the same time as the set at the speech channel, the the system is controlled at the receiving state, then the presence or the absence of the carrier signal is detected. If the carrier signal is present, it is detected that the speech channel is busy and the system is reset at the initial state. If the carrier signal is absent, the ATIS sign of the station is then transmitted and the both stations will enter into the mutual communication after the passing of a predetermined time period. If the call mode is the general call, the frequency of the system is at one shifted to the designated speech channel and both of stations will enter into the state of mutual communication. If a switch for rejecting the general call is provided separately, it becomes possible not to answer to the general call.

Referring next to the flow chart shown in the right hand side part of FIG. 3B-2, an operation for break into a busy channel which is picked up by the search operation will be explained next.

When the break switch 29 is operated, the system is set at the receiving state on a speech channel which is initially selected randomly. In this state, the presence or absence of the carrier signal is judged by the output signal of the carrier detector 17. If the carrier signal is not present, the speech channel is set forward to the next one and the presence or absence of the carrier signal is detected once more. Then the data of the speech channel in which the carrier signal is present is memorized in the RAM 24, and after that the system is set at this speech channel and the stations will enter into the state of mutual communication. If, in this state, the operator of the system does not prefer the transmission, the operation of the system will be a simple monitoring of a call on the speech channel. If no carrier signal is detected after a search throughout the whole channel, the system will be automatically reset at the initial state.

It will be understood from the foregoing that according to the present invention, a responding station which is called through the call channel automatically transmits the ATIS sign of the station and the comparison between the ATIS sign from the responding station and the designated ATIS sign transmitted from the caller station takes place in the system of the caller station. The mutual communication is enabled only when the compared ATIS signs are equal to each other, therefore an erroneous call or an erroneous connection with a responding station can be eliminated. Further, the occupation of a speech channel is prevented since the communications system is automatically reset to the stand by state at the call channel if the ATIS signs are not equal. In addition, according to the present invention, the searching of a non-busy channel is performed automatically and positively, and therefore the operation of the system is made by far simple and reliable.

Moreover, since the information of station is also transmitted from the responding station via the designated speech channel, the erroneous connection is positively prevented.

It should be understood that the foregoing description is for illustrative purpose only, and is not intended to limit the scope of the invention. Rather, there are numerous equivalents to the preferred embodiments, and such are intended to be covered by the appended claims. As an example, the time periods of various operations of the system are not limited to the values shown in the preferred embodiment and are to be determined appropriately in accordance with various conditions such as the followable range of the circuit element. For instance, the detection of the carrier signal which is not to be affected by a pulsative noise such as an ignition noise can be performed during a time period of around 100 ms if the lock up time of the PLL circuit (50 ms) is considered. Furthermore, it is needless to say that the system controller 14, the timer 23, and RAM 24 can be replaced by the so-called micro computer.

What is claimed is:

1. A communications system having a plurality of speech channels one of which is to be selected to convey an information, adapted to perform a simplex communication, comprising:
    a searching operation control means for comanding sequential operations of (I) setting the communications system to a receiving state at a speech channel and detecting the presence of a carrier signal and in turn selecting a next speech channel and detecting the presence of a carrier signal if the carrier signal is present at said speech channel, (II) transmitting an audible signal at a selected speech channel at which the carrier signal is not detected, (III) detecting once more the presence of the carrier signal at the selected speech channel, and (IV) memorizing infomation of the selected speech channel as a non-busy speech channel only if the carrier signal is not present at the selected speech channel.

2. A communications system operative as a caller station and having a plurality of speech channels one of which is to be selected to convey an information and adapted to perform simplex communication using a searching operation of a sequence of (I) setting the communications system to a receiving state at a speech channel and detecting the presence of a carrier signal and in turn selecting a next speech channel and detecting the presence of the carrier signal if the carrier signal is present at the speech channel, (II) transmitting an audible signal at a selected speech channel at which the carrier signal is not detected, (III) detecting once more the presence of the carrier signal at the selected speech channel, and (IV) identifying the selected speech channel as a non-busy speech channel only if the carrier signal is not present at the selected speech channel, said communications system having means for receiving an audible signal transmitted from a third station and generating an output signal while a call between the caller station and a responding station is taking place at the selected speech channel, thereby indicating a break on the selected speech channel by means of the output signal of said means for receiving an audible signal.

* * * * *